United States Patent
Liu et al.

(10) Patent No.: US 8,963,856 B2
(45) Date of Patent: Feb. 24, 2015

(54) TOUCH SENSING LAYER AND MANUFACTURING METHOD THEREOF

(75) Inventors: Chen-Yu Liu, Jhongli (TW); Lu-Hsing Lee, Longtan Township (TW); Cheng-Chieh Chang, Tainan (TW); Ching-Shan Lin, Kaohsiung (TW)

(73) Assignee: TPK Touch Solutions Inc., Taipei (TW)

( * ) Notice: Subject to any disclaimer, the term of this patent is extended or adjusted under 35 U.S.C. 154(b) by 56 days.

(21) Appl. No.: 13/364,321

(22) Filed: Feb. 2, 2012

(65) Prior Publication Data

US 2012/0319964 A1 Dec. 20, 2012

(30) Foreign Application Priority Data

Jun. 15, 2011 (CN) .......................... 2011 1 0161051

(51) Int. Cl.
*G06F 3/041* (2006.01)
*G06F 3/044* (2006.01)
*G06F 3/045* (2006.01)

(52) U.S. Cl.
CPC ................ *G06F 3/044* (2013.01); *G06F 3/045* (2013.01)
USPC ........................................................ 345/173

(58) Field of Classification Search
USPC .......................................... 345/173, 174, 156
See application file for complete search history.

(56) References Cited

U.S. PATENT DOCUMENTS

| | | | |
|---|---|---|---|
| 4,028,509 A | 6/1977 | Zurcher | |
| 4,233,522 A | 11/1980 | Grummer et al. | |
| 4,550,221 A | 10/1985 | Mabusth | |
| 4,639,720 A | 1/1987 | Rympalski et al. | |
| 4,733,222 A | 3/1988 | Evans | |
| 5,374,787 A | 12/1994 | Miller et al. | |
| 5,381,160 A | 1/1995 | Landmeier | |
| 5,495,077 A | 2/1996 | Miller et al. | |
| 5,543,590 A | 8/1996 | Gillespie et al. | |
| 5,648,642 A | 7/1997 | Miller et al. | |
| 5,844,506 A | 12/1998 | Binstead | |
| 5,880,411 A | 3/1999 | Gillespie et al. | |
| 5,992,233 A * | 11/1999 | Clark | 73/514.35 |
| 6,005,555 A | 12/1999 | Katsurahira et al. | |
| 6,114,862 A | 9/2000 | Tartagni et al. | |
| 6,137,427 A | 10/2000 | Binstead et al. | |
| 6,177,918 B1 | 1/2001 | Colgan et al. | |
| 6,188,391 B1 | 2/2001 | Seely et al. | |

(Continued)

FOREIGN PATENT DOCUMENTS

| | | |
|---|---|---|
| CN | 1185844 | 6/1998 |
| CN | 1754141 | 3/2006 |

(Continued)

*Primary Examiner* — Fred Tzeng
(74) *Attorney, Agent, or Firm* — Gokalp Bayramoglu

(57) ABSTRACT

The present invention relates to a touch sensing layer which comprises at least one first-axis sensing electrode, second-axis sensing electrode, insulating element and conductive bridge. Each first-axis sensing electrode comprises a plurality of first electrode patterns with discontinuity-in-series, and each second-axis sensing electrode is configured to interlace with each first-axis sensing electrode and comprises a plurality of second electrode patterns with continuity-in-series. Each insulating element is continuously formed on the corresponding second-axis sensing electrode, and each conductive bridge is also continuously formed above the corresponding first-axis sensing electrode and crosses the insulating element to connect those first electrode patterns with discontinuity-in-series.

20 Claims, 5 Drawing Sheets

(56) References Cited

U.S. PATENT DOCUMENTS

| | | |
|---|---|---|
| 6,239,389 B1 | 5/2001 | Allen et al. |
| 6,392,636 B1 | 5/2002 | Ferrari et al. |
| 6,414,671 B1 | 7/2002 | Gillespie et al. |
| 6,496,021 B2 | 12/2002 | Tartagni et al. |
| 6,498,590 B1 | 12/2002 | Dietz et al. |
| 6,664,489 B2 | 12/2003 | Kleinhans et al. |
| 6,740,945 B2 | 5/2004 | Lepert et al. |
| 6,924,789 B2 | 8/2005 | Bick |
| 6,970,160 B2 | 11/2005 | Mulligan et al. |
| 7,030,860 B1 | 4/2006 | Hsu et al. |
| 7,202,859 B1 | 4/2007 | Speck et al. |
| 7,292,229 B2 | 11/2007 | Morag et al. |
| 7,382,139 B2 | 6/2008 | Mackey |
| 7,439,962 B2 | 10/2008 | Reynolds et al. |
| 7,463,246 B2 | 12/2008 | Mackey et al. |
| 7,477,242 B2 | 1/2009 | Cross et al. |
| 7,532,205 B2 | 5/2009 | Gillespie et al. |
| 7,589,713 B2 | 9/2009 | Sato |
| 7,663,607 B2 | 2/2010 | Hotelling et al. |
| 7,671,847 B2 | 3/2010 | Weng |
| 7,821,502 B2 | 10/2010 | Hristov |
| 7,864,160 B2 | 1/2011 | Geaghan et al. |
| 7,952,564 B2 | 5/2011 | Hurst et al. |
| 8,004,497 B2 | 8/2011 | XiaoPing |
| 8,040,321 B2 | 10/2011 | Peng et al. |
| 8,058,937 B2 | 11/2011 | Qin et al. |
| 8,059,015 B2 | 11/2011 | Hua et al. |
| 8,068,097 B2 | 11/2011 | GuangHai |
| 8,068,186 B2 | 11/2011 | Aufderheide |
| 8,072,429 B2 | 12/2011 | Grivna |
| 8,085,250 B2 | 12/2011 | Reynolds et al. |
| 8,111,243 B2 | 2/2012 | Peng et al. |
| 8,120,584 B2 | 2/2012 | Grivna et al. |
| 8,144,125 B2 | 3/2012 | Peng et al. |
| 8,169,421 B2 | 5/2012 | Wright et al. |
| 8,217,902 B2 | 7/2012 | Chang et al. |
| 8,653,382 B2 * | 2/2014 | Kim et al. .................... 174/261 |
| 2002/0186330 A1 | 12/2002 | Kawasaki |
| 2003/0048261 A1 | 3/2003 | Yamomoto et al. |
| 2003/0234770 A1 | 12/2003 | MacKey et al. |
| 2004/0119701 A1 | 6/2004 | Mulligan et al. |
| 2004/0178997 A1 | 9/2004 | Gillespie et al. |
| 2005/0030048 A1 | 2/2005 | Bolender et al. |
| 2006/0066581 A1 | 3/2006 | Lyon et al. |
| 2006/0097991 A1 | 5/2006 | Hotelling et al. |
| 2006/0274055 A1 | 12/2006 | Reynolds et al. |
| 2007/0046648 A1 | 3/2007 | Lee et al. |
| 2007/0132737 A1 | 6/2007 | Mulligan et al. |
| 2007/0229469 A1 | 10/2007 | Seguine et al. |
| 2007/0229470 A1 | 10/2007 | Snyder et al. |
| 2007/0236618 A1 | 10/2007 | Maag et al. |
| 2007/0240914 A1 | 10/2007 | Lai et al. |
| 2007/0242054 A1 | 10/2007 | Chang et al. |
| 2007/0273672 A1 | 11/2007 | Hong et al. |
| 2008/0036473 A1 | 2/2008 | Jansson et al. |
| 2008/0074398 A1 | 3/2008 | Wright |
| 2008/0150906 A1 | 6/2008 | Grivna et al. |
| 2008/0180399 A1 | 7/2008 | Cheng |
| 2008/0231605 A1 | 9/2008 | Yang |
| 2008/0264699 A1 | 10/2008 | Chang et al. |
| 2009/0160682 A1 | 6/2009 | Bolender et al. |
| 2009/0160824 A1 | 6/2009 | Chih-Yung et al. |
| 2009/0277695 A1 | 11/2009 | Liu et al. |
| 2010/0007616 A1 | 1/2010 | Jang et al. |
| 2010/0045614 A1 | 2/2010 | Gray et al. |
| 2010/0073310 A1 | 3/2010 | Liang et al. |
| 2010/0073319 A1 | 3/2010 | Lyon et al. |
| 2010/0079384 A1 | 4/2010 | Grivna et al. |
| 2010/0156810 A1 | 6/2010 | Barbier et al. |
| 2010/0201633 A1 | 8/2010 | Mozdzyn |
| 2010/0253645 A1 | 10/2010 | Bolender |
| 2011/0141038 A1 | 6/2011 | Kuo et al. |
| 2011/0248953 A1 | 10/2011 | Lee et al. |
| 2012/0062487 A1 | 3/2012 | Lee et al. |
| 2012/0068968 A1 | 3/2012 | Reynolds et al. |
| 2012/0113042 A1 | 5/2012 | Bayramoglu et al. |
| 2012/0127099 A1 | 5/2012 | Liu et al. |
| 2012/0139871 A1 * | 6/2012 | Ku et al. ...................... 345/174 |
| 2012/0242613 A1 * | 9/2012 | Hsu ............................. 345/174 |
| 2013/0037330 A1 * | 2/2013 | Singh ....................... 178/18.06 |
| 2013/0038378 A1 * | 2/2013 | Singh et al. ................. 327/517 |

FOREIGN PATENT DOCUMENTS

| | | |
|---|---|---|
| CN | 1818842 | 8/2006 |
| CN | 101131492 | 2/2008 |
| CN | 201078769 | 6/2008 |
| CN | 101261379 | 9/2008 |
| CN | 101324827 | 12/2008 |
| CN | 101349960 | 1/2009 |
| CN | 101359265 | 2/2009 |
| CN | 101441545 | 5/2009 |
| CN | 201298221 | 8/2009 |
| CN | 101587391 | 11/2009 |
| CN | 201374687 | 12/2009 |
| CN | 101692193 | 4/2010 |
| CN | 202084024 | 12/2011 |
| EP | 2530565 | 12/2012 |
| EP | 2290512 | 1/2014 |
| EP | 2447815 | 1/2014 |
| GB | 2168816 | 6/1986 |
| JP | 57204938 | 12/1982 |
| JP | 58166437 | 1/1983 |
| JP | S58171573 | 10/1983 |
| JP | 6184729 | 4/1984 |
| JP | 60075927 | 4/1985 |
| JP | S61173333 | 8/1986 |
| JP | 3149113 | 3/2001 |
| JP | 2002252340 | 9/2002 |
| JP | 2008310551 | 12/2008 |
| JP | 2010033478 | 2/2010 |
| JP | 2010160670 | 7/2010 |
| JP | 2010528753 | 8/2010 |
| JP | 2011070659 | 4/2011 |
| JP | 2011198339 | 10/2011 |
| JP | 2012094147 | 5/2012 |
| KR | 1020070102414 | 10/2007 |
| KR | 1020080096352 | 10/2007 |
| KR | 101040881 | 6/2011 |
| KR | 101073333 | 10/2011 |
| TW | I274529 | 2/2007 |
| TW | M342558 | 10/2008 |
| TW | 200842681 | 11/2008 |
| TW | M345294 | 11/2008 |
| TW | M423866 | 3/2012 |

* cited by examiner

TOUCH SENSING LAYER AND MANUFACTURING METHOD THEREOF

This application claims the benefit of China application No. 201110161051.9, filed on Jun. 15, 2011.

FIELD OF THE INVENTION

The present invention relates to a touch sensing structure and manufacturing method thereof, and more particularly relates to design of a touch sensing layer and manufacturing method thereof.

BACKGROUND OF THE INVENTION

In recent years, touch sensing technology has been widely applied to various electronic devices used in daily life, serving as input interface for numerous electronic devices, such as display devices, mobile phones or game machines. The technology is to press or touch on a touch sensing device by a finger or a stylus to access or transmit information without operation of other conventional input interfaces (such as button, keyboard or operating rod).

For the above touch sensing device, a touch sensing layer is configured inside so that corresponding touch sensing signals will be generated due to the external press or touch. Referring to FIG. 1 which shows a conventional structure of a touch sensing layer 100. The touch sensing layer 100 is mainly composed of at least one Y-axis sensing electrode 110 and one X-axis sensing electrode 120, wherein the Y-axis sensing electrode 110 comprises a plurality of electrode patterns with discontinuity-in-series, while the X-axis sensing electrode 120 is configured to interlace with the Y-axis sensing electrode 110 and comprises a plurality of electrode patterns with continuity-in-series. In order to avoid short circuit due to electric conduction between the two axes, a corresponding insulation pad 130 is formed at the intersection of the two axes. A conductive bridge 140 is formed on each insulation pad 130 and connected to the Y-axis sensing electrode 110 with discontinuity-in-series to transmit Y-axis sensing signals.

Conventional insulation pad 130 and the conductive bridge 140 are formed as independent entities, so the matter of para-position explain for those independent entities, as shown in FIG. 1, should be considered during manufacturing which may increase the difficulty of manufacturing. Therefore, there is a need for designing a touch sensing layer and manufacturing method thereof to overcome the shortcomings of conventional structure and manufacturing method.

SUMMARY OF THE INVENTION

It is one of the objects of the present invention to provide a touch sensing layer and a manufacturing method thereof with a continuous structure so as to simplify the manufacturing process.

In order to accomplish the above object, the present invention provides a touch sensing layer which comprises at least one first-axis sensing electrode unit, at least one second-axis sensing electrode unit, an insulating element and a conductive bridge. First-axis sensing electrode unit comprises a plurality of separately-arranged first electrodes along a first axis. The second-axis sensing electrode unit is configured to interlace with first-axis sensing electrode unit and comprises a plurality of connected second electrodes arranged along a second axis The insulating element is continuously formed on the corresponding second-axis sensing electrode unit, and the conductive bridge is configured correspondingly to the intersection of the first-axis sensing electrode unit and the second-axis sensing electrode unit. The conductive bridge crosses the insulating element to connect two adjacent first electrodes arranged along the first axis.

In order to accomplish the above object, the present invention further provides a touch sensing layer which comprises at least one first-axis sensing electrode unit, at least one second-axis sensing electrode unit, an insulating element and a conductive bridge. Each first-axis sensing electrode unit comprises a plurality of separately-arranged first electrodes along a first axis, and each second-axis sensing electrode unit is configured to interlace with each first-axis sensing electrode unit and comprises a plurality of connected second electrodes arranged along a second axis. Each insulating element is formed corresponding to the intersection of the first-axis sensing electrode unit and the second-axis sensing electrode unit. The conductive bridge is continuously configured above the corresponding first-axis sensing electrode unit and crosses the insulating elements arranged on the same column to connect those separately-arranged first electrodes on the same column.

In order to accomplish the above object, the present invention further provides a touch sensing layer which comprises at least one first-axis sensing electrode unit, at least one second-axis sensing electrode unit, at least one insulating element and at least one conductive bridge. Each first-axis sensing electrode unit comprises a plurality of separately-arranged first electrodes along a first axis. Each second-axis sensing electrode unit is configured to interlace with each first-axis sensing electrode unit and comprises a plurality of connected second electrodes arranged along a second axis. Each insulating element is continuously formed on the corresponding second-axis sensing electrode unit. The conductive bridge is continuously configured above the corresponding first-axis sensing electrode unit and crosses the insulating elements to connect those separately-arranged first electrodes on the same column.

In order to accomplish the above object, the present invention further provides a method for manufacturing a touch sensing layer, which comprises: forming at least one first-axis sensing electrode unit and one second-axis sensing electrode unit, wherein the first-axis sensing electrode unit comprises a plurality of separately-arranged first electrodes along a first axis and the second-axis sensing electrode unit is configured to interlace with the first-axis sensing electrode unit and comprises a plurality of connected second electrodes arranged along a second axis; forming an insulating element, by a first, printing process or a photolithography process; and forming a conductive bridge by a second printing process or the photolithography process.

DETAILED DESCRIPTION OF THE EMBODIMENTS

Figure 1:
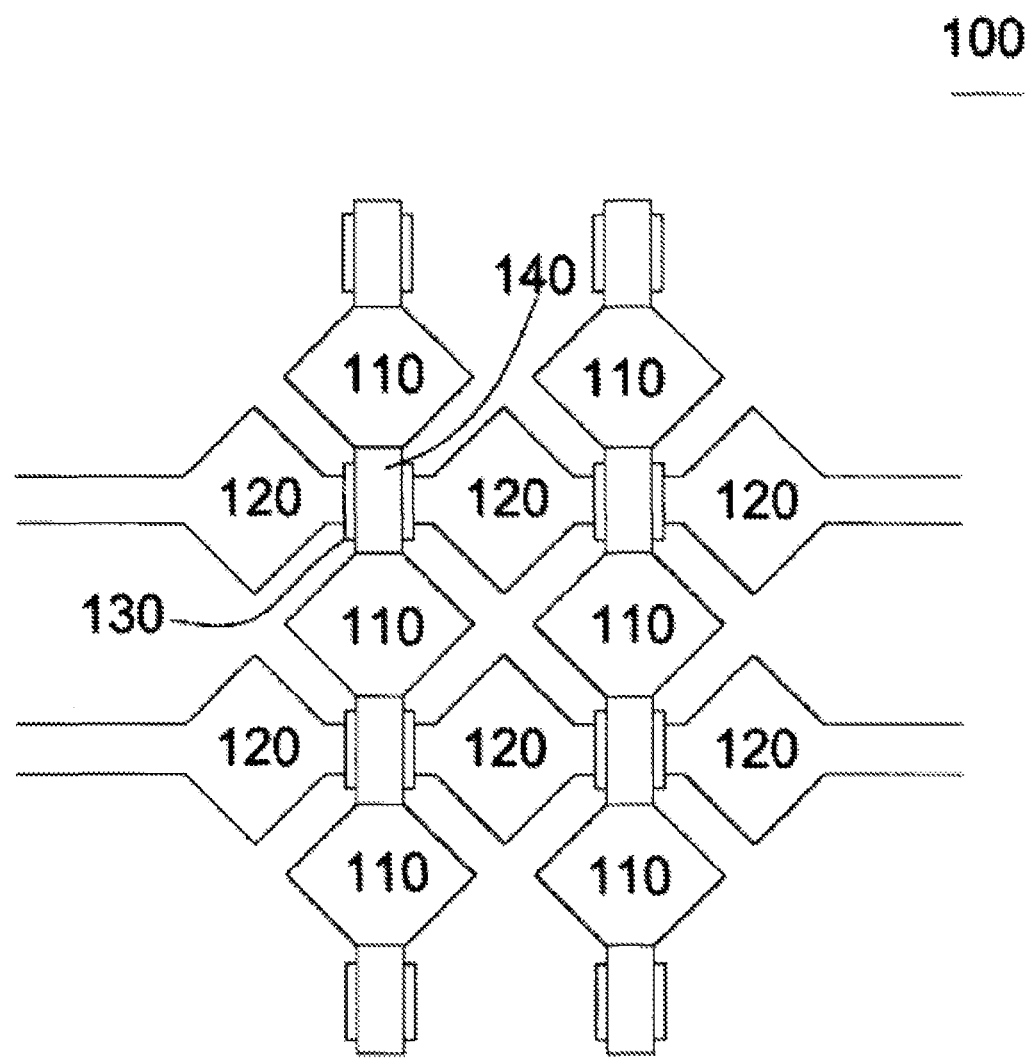
FIG. 1 shows a conventional structure of a touch sensing layer.

Detailed description of some embodiments of the present invention is as follows, and the present invention can also be widely applied to other embodiments. Moreover, elements or structures in the drawings of the present invention's embodiments are described by way of illustration not limitation. Furthermore, in this specification, certain parts of the elements are not drawn completely according to the sizes; some sizes are exaggerated or simplified comparing with other relevant sizes so as to provide clearer description and enhance understanding of the present invention.

Figure 2:
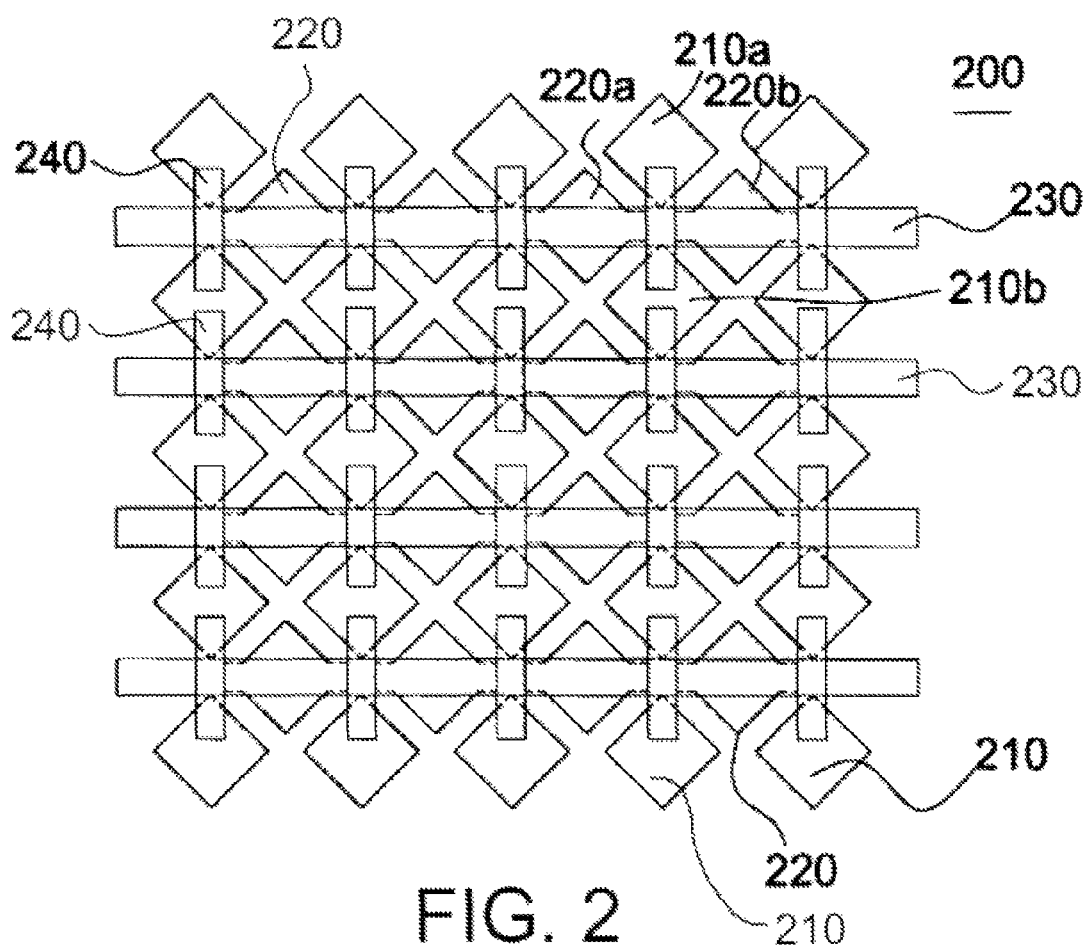
FIG. 2 is a schematic top view of a touch sensing layer in accordance with the first embodiment of the present invention.

Referring to FIG. 2, it is the top view of a touch sensing layer in accordance with the first embodiment of the present invention. Touch sensing layer 200 shown in FIG. 2 comprises: a plurality of first-axis sensing electrode units 210, a plurality of second-axis sensing electrode units 220, a plurality of insulating elements 230 and a plurality of conductive bridges 240. Each first-axis sensing electrode unit 210 comprises a plurality of first electrodes (hereby 210 a and 210 b represent the first. electrodes) with discontinuity-in-series. In other words, the first electrode 210 a and first electrode 210 b are separated from each other, and are arranged along a first axis. Each second-axis sensing electrode it 220 is configured to interlace with each first-axis sensing electrode unit 210 and comprises a plurality of second electrodes (hereby 220 a and 220 b represent the second electrodes patterns) with continuity-in-series. In other words, the second electrode 220 a and second electrode 220 b are connected with each other, and are arranged along a second axis. The "first-axis" can represent Y-axis while the "second-axis" represents X-axis, or the "first-axis" can also represent X-axis while the "second-axis" represents Y-axis. The forming way as discontinuity-in-series means electrodes are not electrically connected to each other but placed on the same line or on the same column, for example, the adjacent first electrode 210 a and the first. electrode 210 b are placed on the same column but independently from each other without any connection; while the forming way as continuity-in-series means electrode patterns are electrically connected to each other and also placed on the same line or on the same column, for example, the adjacent second electrode 220 a is connected to the second electrode 220 b with a link and both of the second electrode 220 a and the second electrode 220 b are placed on the same row, wherein the link is covered by the insulating element 230. Hereinafter the meanings of the discontinuity-in-series and continuity-in-series described in other embodiments are similar to the above-mentioned and therefore no more description again.

In the present embodiment, each insulating element 230 (namely the horizontal strip structure shown in FIG. 2) is continuously formed on the corresponding second-axis sensing electrode unit 220, and each conductive bridge 240 is configured corresponding to the intersection of the first-axis sensing electrode unit 210 and the second-axis sensing electrode unit 220 (namely the intersection along X-axis sensing electrode unit and Y-axis sensing electrode unit) and crosses the insulating element 230 to connect two adjacent first electrodes 210 a and 210 b. The insulating element 230 is configured to avoid short circuit between the first-axis and second-axis sensing electrode units 210, 220, which may impact the sensitivity of detecting touches, when the conductive bridge 240 is electrically connected to the adjacent first electrodes.

Figure 3:
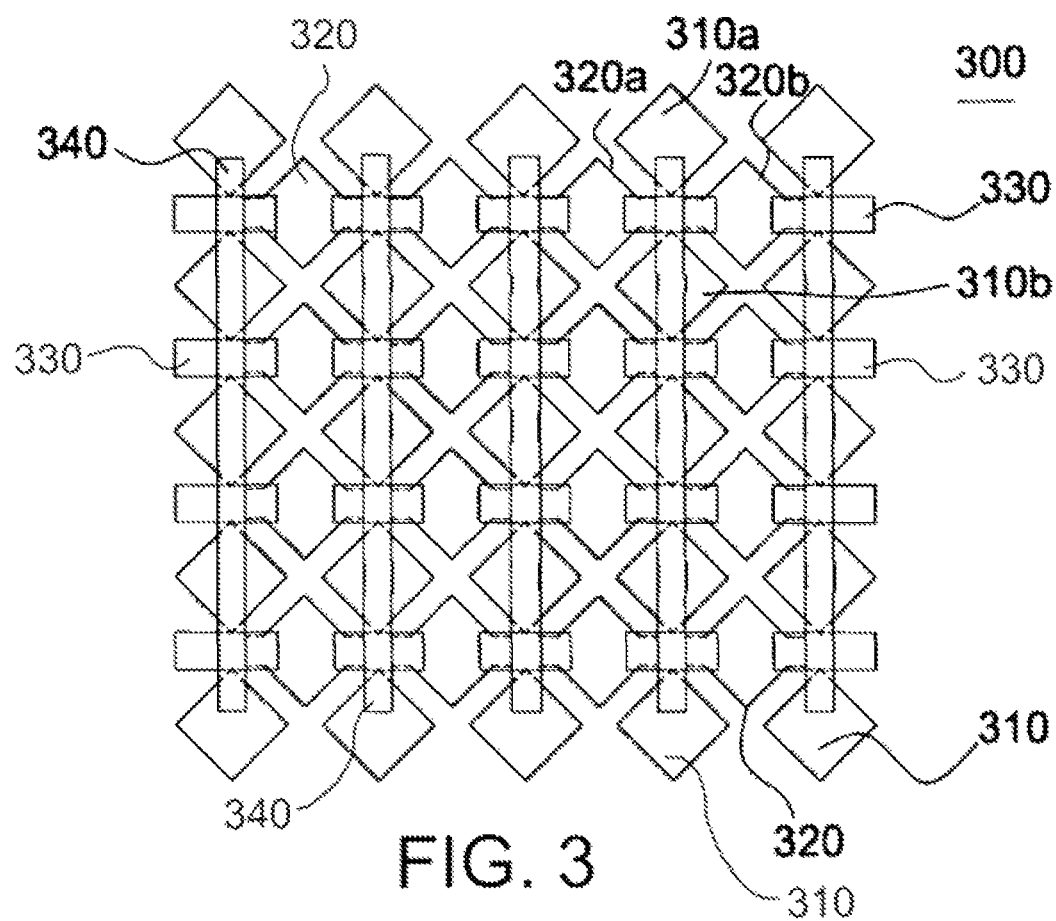
FIG. 3 is a schematic top view of a touch sensing layer in accordance with the second embodiment of the present invention.

Referring to FIG. 3, it is a schematic top view of a touch sensing layer in accordance with the second embodiment of the present invention. Touch sensing layer 300 shown in FIG. 3 comprises: a plurality of first-axis sensing electrode units 310, a plurality of second-axis sensing electrode units 320, a plurality of insulating elements 330 and a plurality of conductive bridges 340. Each first-axis sensing electrode unit 310 comprises a plurality of electrodes (hereby 310 a and 310 b represent the first electrodes) with discontinuity-in-series, and each second-axis sensing electrode unit 320 is configured to interlace with each first-axis sensing electrode unit 310 and comprises a plurality of second electrodes (hereby 320 a and 320 b represent the second electrodes) with continuity-in-series. The "first-axis" can represent Y-axis while the "second-axis" represents X-axis, or the "first-axis" can also represent X-axis while the "second-axis" represents Y-axis.

In the present embodiment, each insulating element 330 is formed correspondingly to the intersection of the first-axis sensing electrode units 310 and the second-axis sensing electrode units 320 (namely the intersection along X-axis and Y-axis). In other words, each insulating element 330 is formed on each intersection as a single body. Each conductive bridge 340 (namely the vertical strip structure shown in FIG. 3) is continuously configured above the first-axis sensing electrode unit 310 and one conductive bridge 340 crosses a plurality of insulating elements 330 arranged on the same column to connect those separately-arranged first electrodes on the same column, such as, the first electrodes 310 a and 310 b. Similarly, the insulating element 330 is configured to avoid short circuit between the first-axis and second-axis sensing electrode units 310, 320, when the conductive bridge 340 is electrically connected to the separately-arranged first electrodes on the same column.

Figure 4:
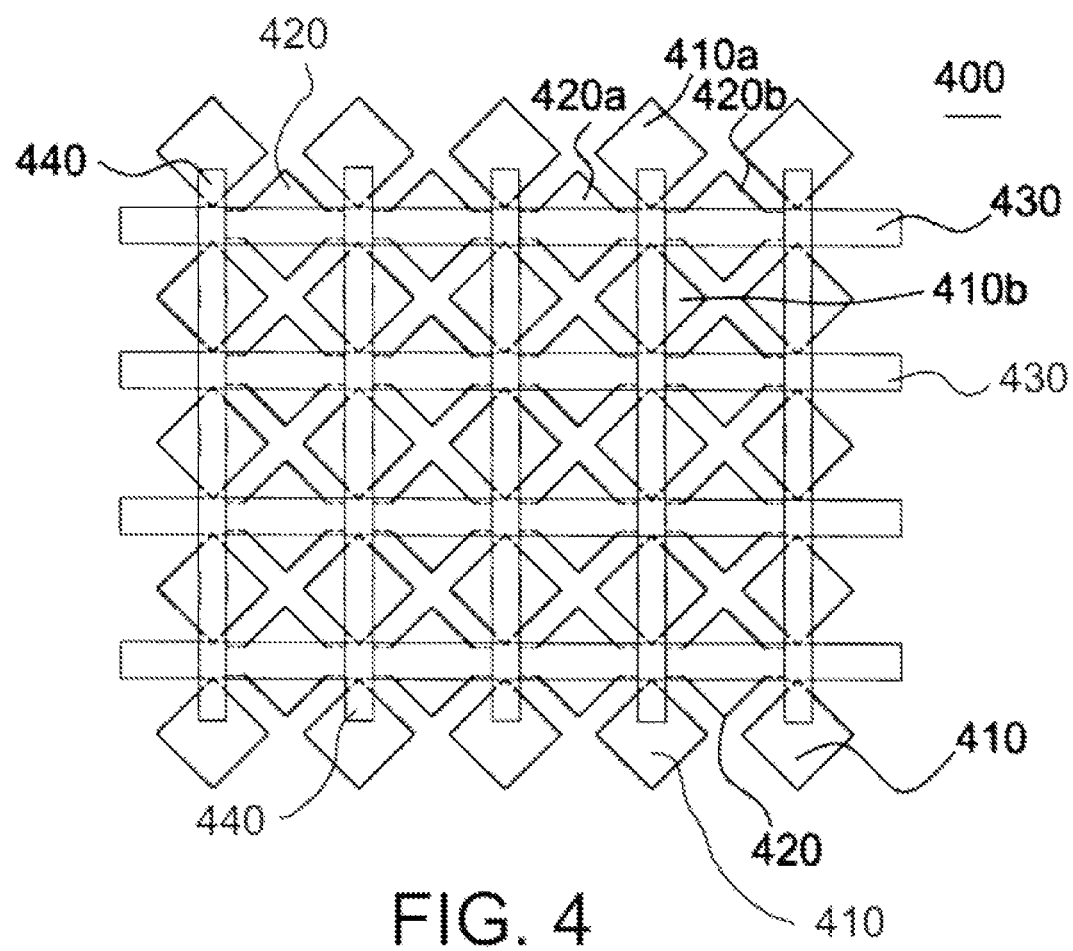
FIG. 4 is a schematic top view of a touch sensing layer in accordance with the third embodiment of the present invention.

Referring to FIG. 4, it is a schematic top view of a touch sensing layer in accordance with the third embodiment of the present invention. Touch sensing layer 400 shown in FIG. 4 comprises: a plurality of first-axis sensing electrode units 410, a plurality of second-axis sensing electrode units 420, a plurality of insulating element 430 and a plurality of conductive bridges 440. Each first-axis sensing electrode unit 410 comprises a plurality of first electrode electrodes (hereby 410 a and 410 b represent. the first. electrodes) with discontinuity-in-series, and each second-axis sensing electrode unit 420 is configured to interlace with each first-axis sensing electrode unit 410 and comprises a plurality of second electrodes (hereby 420 a and 420 b represent the second electrodes) with continuity-in-series. The "first-axis" can represent Y-axis While the "second-axis" represents X-axis, or the "first-axis" can also represent X-axis while the "second-axis" represents Y-axis.

In the present embodiment, each insulating element 430 (namely the horizontal strip structure shown in FIG. 4) is continuously formed on the corresponding second-axis sensing electrode unit 420, and each conductive bridge 440 (namely the vertical strip structure shown in FIG. 4) is continuously configured above the corresponding first-axis sensing electrode unit 410. One conductive bridge 440 crosses a plurality of insulating elements 430 to connect those separately-arranged first electrodes on the same column, such as, the first electrodes 410 a and 410 b. Similarly, the insulating element 430 is configured to avoid short circuit between the first-axis and second-axis sensing electrode units 310, 320, when the conductive bridge 440 is electrically connected to the separately-arranged first electrodes on the same column.

Figure 5:
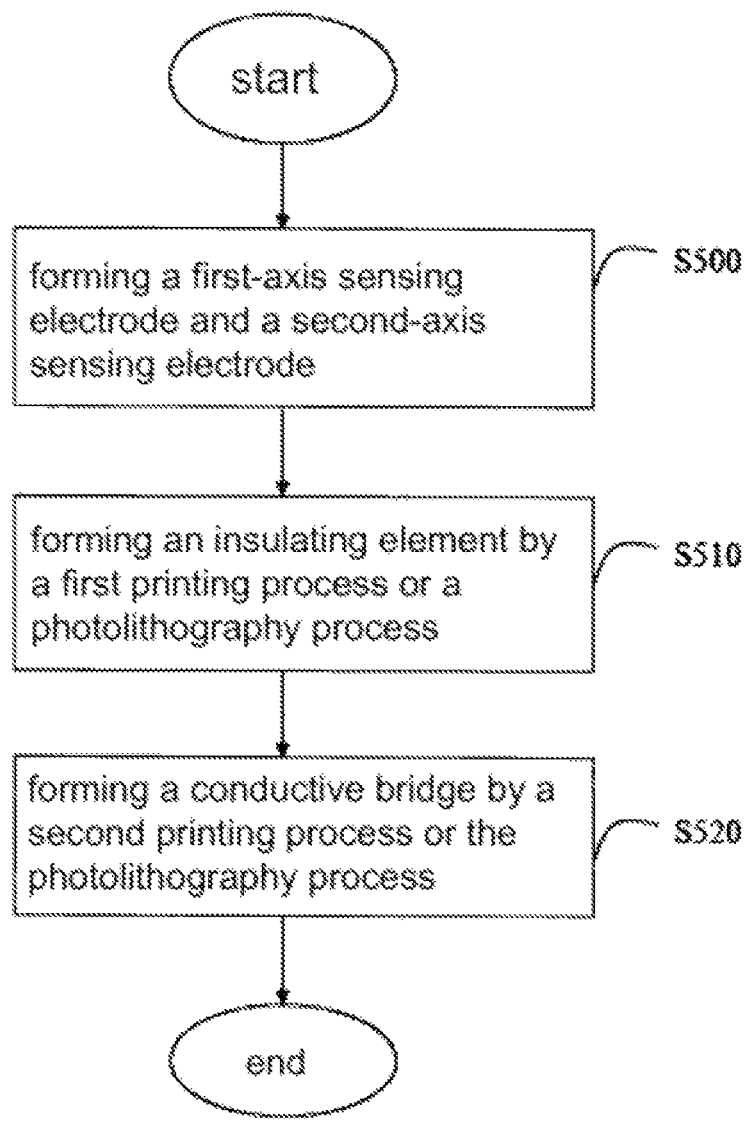
FIG. 5 is a flowchart of a method for manufacturing a touch sensing layer in accordance with the present invention.

FIG. 5 is a flowchart of a method for manufacturing a touch sensing layer in accordance with the present invention. First, in step S500, a plurality of first-axis sensing electrode units and a plurality of second-axis sensing electrode units are formed. Each first-axis sensing electrode unit comprises a plurality of separated first electrodes and each second-axis sensing electrode unit is configured to interlace with the first-axis sensing electrode unit and comprises a plurality of connected second electrodes. Next, in step S510, a plurality of insulating elements are formed by a first printing process, and in step S520, a plurality of conductive bridges are formed by a second printing process.

The first printing process is to continuously form the insulating elements 230 on the corresponding second-axis sensing electrode units 220, as shown in FIG. 2. The second printing process is to form one single conductive bridge corresponding to each of the intersections of the first-axis sensing electrode units 210 and the second-axis sensing electrode units 220. Each conductive bridge 240 crosses the insulating element to connect two adjacent first electrodes, as shown in FIG. 2. Moreover, as shown in FIG. 3, the first printing process can also be performed for forming the insulating element 330 corresponding to the intersection of the first-axis sensing electrode units 310 and the second-axis sensing electrode units 320. The second printing process is performed to form the conductive bridge 340 above the corresponding first-axis sensing electrode units 310. The conductive bridges 340 crosses the insulating elements 330 arranged on the same column to connect those separately-arranged first electrodes. Furthermore, as shown in FIG. 4, the first printing process can be performed for forming the insulating element 430 on the corresponding second-axis sensing electrode unit 420. The second printing process is also performed to form the conductive bridge 440 above the corresponding first-axis sensing electrode unit 410. One conductive bridge 440 crosses a plurality of insulating elements 430 to connect those separately-arranged first electrodes on the same column.

The insulating element and conductive bridge mentioned in all the above embodiments are formed by printing process, wherein the first printing process forming the insulating element can be a contact printing process or a non-contact printing process and the second printing process forming the conductive bridge can also be a contact printing process or a non-contact printing process.

For the contact printing process, such as a screen printing, the printing fixture will contact a substrate (not shown) to form the first-axis sensing electrode units and the second-axis sensing electrode units during the process of printing. For the non-contact printing process, the printing fixture will not contact a substrate (not shown) to form the first-axis sensing electrode units and the second-axis sensing electrode units during the process of printing, namely forming the insulating element and/or conductive bridge by jetting ink with a fixture which has a nozzle. The non-contact printing method could be an ink jet printing process, a continuous jet printing process and an aerosol printing process. In one embodiment, the strip-shaped insulating element and conductive bridge, as shown in FIG. 4, can be formed by a continuous jet printing process; in the other preferred embodiment, the insulating element on FIG. 3 and conductive bridge on FIG. 2 can be formed by the continuous jet printing process collocating with a shutter.

Either photolithography process or the above printing process can be adopted for the first-axis sensing electrode units and the second-axis sensing electrode units. The insulating element and/or the conductive bridge can also be formed by a photolithography process, such as in step S510 shown in FIG. 5, a continuous insulating element can be formed on the second-axis sensing electrode unit by the photolithography process, and in step S520, a conductive bridge can be formed on the insulating element, by the photolithography process. Or in step S510 shown in FIG. 5, an insulating element can be formed on the intersection of the first-axis sensing electrode units and the second-axis sensing electrode units by the photolithography process, and in step S520, a continuous conductive bridge can be formed above the corresponding first-axis sensing electrode units by the photolithography process and the conductive bridge crosses the insulating elements to connect those separately-arranged first electrodes on the same column. The conductive bridge can be made of transparent conductive material or non-transparent conductive material.

Thereby, when forming continuous insulating element and conductive bridge in accordance with the present invention, there is no need to consider the matter of para-position for those conventional independent entities, which reduces difficulty of the manufacturing process.

While, certain embodiments have been shown and described, various modifications and substitutions may be made thereto without departing from the spirit and scope of the invention. Accordingly, it is to be understood that the present invention has been described by way of illustration and not limitations.

What is claimed is:

1. A touch sensing layer, comprising:
   a plurality of first-axis sensing electrode units, each of the first-axis sensing electrode units comprising a plurality of separated first electrodes arranged along a first axis;
   a plurality of second-axis sensing electrode units, each of the second-axis sensing electrode units interlaced with the first-axis sensing electrode units and comprising a plurality of connected second electrodes arranged along a second axis;
   a plurality of insulating elements, each of the insulating elements continuously formed on the corresponding second-axis sensing electrode unit; and
   a plurality of conductive bridges, each of the conductive bridges formed corresponding to the intersection of the first-axis sensing electrode units and the second-axis sensing electrode units and crossing the insulating element to connect the adjacent first electrodes.

2. The touch sensing layer according to claim 1, wherein the insulating elements and the conductive bridges are formed by a printing process.

3. The touch sensing layer according to claim 2, wherein the printing process forming the insulating elements is a contact printing process or a non-contact printing process.

4. The touch sensing layer according to claim 2, wherein the printing process forming the conductive bridges is a contact printing process or a non-contact printing process.

5. The touch sensing layer according to claim 1, wherein the insulating elements or the conductive bridges are formed by a photolithography process.

6. A touch sensing layer, comprising:
   a plurality of first-axis sensing electrode units, each of the first-axis sensing electrode units comprising a plurality of separated first electrodes arranged along a first axis;
   a plurality of second-axis sensing electrode units, each of the second-axis sensing electrode units interlaced with the first-axis sensing electrode units and comprising a plurality of connected second electrodes arranged along a second axis;
   a plurality of insulating elements, each of the insulating elements formed corresponding to the intersection of the first-axis sensing electrode units and the second-axis sensing electrode units; and a plurality of conductive bridges, each of the conductive bridges continuously configured above the corresponding first-axis sensing electrode unit and crossing the insulating elements.

7. The touch sensing layer according to claim 6, wherein the insulating elements and the conductive bridges are formed by a printing process, and the printing process is a contact printing process or a non-contact printing process.

8. The touch sensing layer according to claim 6, wherein the insulating elements or the conductive bridges are formed by a photolithography process.

9. A touch sensing layer, comprising:
a plurality of first-axis sensing electrode units, each of the first-axis sensing electrode units comprising a plurality of separated first electrodes arranged along a first axis;
a plurality of second-axis sensing electrode units, each of the second-axis sensing electrode units interlaced with the first-axis sensing electrode units and comprising a plurality of connected second electrodes arranged along a second axis;
a plurality of insulating elements, each of the insulating elements continuously formed on the corresponding second-axis sensing electrode unit; and
a plurality of conductive bridges, each of the conductive bridges continuously configured above the corresponding first-axis sensing electrode unit and crossing the insulating elements.

10. The touch sensing layer according to claim 9, wherein the insulating elements and the conductive bridges are formed by a printing process, and the printing process is a contact printing process or a non-contact printing process.

11. The touch sensing layer according to claim 9, wherein the insulating elements or the conductive bridges are formed by a photolithography process.

12. A method for manufacturing a touch sensing layer, comprising:
forming a plurality of first-axis sensing electrode units and a plurality of second-axis sensing electrode units, wherein each of the first-axis sensing electrode units comprises a plurality of separated first electrodes arranged along a first axis, and each of the second-axis sensing electrode units interlaced with the first-axis sensing electrode units and comprises a plurality of connected second electrodes arranged along a second axis;
forming a plurality of insulating elements for covering the intersection of the first-axis sensing electrode units and the second-axis sensing electrode units; and
forming a plurality of conductive bridges crossing the insulating elements for connecting the adjacent first electrodes.

13. The method for manufacturing a touch sensing layer according to claim 12, wherein the insulating elements are formed by a first printing process, and the first printing process is a contact printing process or a non-contact printing process.

14. The method for manufacturing a touch sensing layer according to claim 12, wherein the conductive bridges are formed by a second printing process, and the second printing process is a contact printing process or a non-contact printing process.

15. The method for manufacturing a touch sensing layer according to claim 12, wherein each of the insulating elements is continuously formed on the corresponding second-axis sensing electrode unit.

16. The method for manufacturing a touch sensing layer according to claim 12, wherein each of the insulating elements is formed correspondingly to the intersection of the first-axis sensing electrode units and the second-axis sensing electrode units.

17. The method for manufacturing a touch sensing layer according to claim 12, wherein each of the conductive bridges is formed correspondingly to the intersection of the first-axis sensing electrode units and the second-axis sensing electrode units, and each of the conductive bridges crosses the insulating element, to connect the adjacent first electrodes.

18. The method for manufacturing a touch sensing layer according to claim 12, wherein each of the conductive bridges is continuously formed above the corresponding first-axis sensing electrode unit and crosses the insulating elements.

19. The method for manufacturing a touch sensing layer according to claim 12, wherein the step of forming a plurality of insulating elements comprises:
forming a continuous insulating element on each of the second-axis sensing electrode units by a photolithography process; and
wherein the step of forming a plurality of conductive bridges comprises:
forming the conductive bridges by the photolithography process.

20. The method for manufacturing a touch sensing layer according to claim 12, wherein the step of forming a plurality of insulating elements comprises:
Forming the insulating elements by a photolithography process; and
wherein the step of forming a plurality of conductive bridges comprises:
forming a continuous conductive bridge above the corresponding first-axis sensing electrode units by the photolithography process.

* * * * *